3,297,611
CURING FURFURYL-ALCOHOL-MODIFIED UREA
FORMALDEHYDE CONDENSATES
Henry A. Hill, Watertown, Mass., assignor to The Borden Company, New York, N.Y., a corporation of New Jersey
No Drawing. Filed June 5, 1964, Ser. No. 373,074
8 Claims. (Cl. 260—29.4)

This invention relates to a composition and process for curing resinous compositions including aminoplast resins.

The invention is particularly useful with furfuryl-alcohol-modified urea formaldehyde condensates, as in the bonding of sand in making foundry molds or cores, and will be illustrated by description in connection with such use.

In the widely used hot box operation, for instance, it is customary to heat a metal mold to a wall temperature of approximately 350°–500° F. and to shape the foundry sand (mixed with the heat curable resin binder and curing agent therefor) against such walls. When the heat from the walls has initiated the exothermic reaction of curing and the curing has progressed to the stage at which the molded sand is firm enough for removal from the mold, the molded form is separated from the hot mold. The curing is then continued, under the influence of the heat which is continuously generated by the exothermic reaction, until the curing is completed.

As the resin in such hot box foundry operation, there is now employed extensively a urea formaldehyde condensate modified by furfuryl alcohol. The curing agent or catalyst is usually an acid or acidic salt. While the resin has advantages, the furfuryl alcohol modification has a very short pot life, i.e., the permissible holding period after the resin and catalyst are mixed. As a result curing or setting up occurs so soon as to interfere with use of the material.

The present invention provides a curing composition and process which, in representative preparations, has doubled the pot life at room temperatures and, with the largest amount of my retarder, has increased the pot life from about 4 hours to more than 30 days, as measured by the time for the exothermic reaction to develop and raise the temperature of the mix to 50° C.

Briefly stated, the invention comprises the herein described process and composition which includes the furfuryl-alcohol-modified urea formaldehyde condensate, curing agent therefor, hexamethylene tetramine ("hexa") and a nitrite, the hexa and nitrite combination serving as pot-life extender or retarder of curing at atmospheric or storage temperatures but not retarding objectionably the curing at the elevated temperature used commercially for the curing.

As to materials, the resin used is a conventional furfuryl-alcohol-modified urea formaldehyde condensate. This material is made in any usual manner, as for instance, as described for "Solution A" in Example I. In making such resin the proportions of reactants may be varied within the commercial ranges, as shown in Table 1.

TABLE 1

| Component | Moles for 1 Mole of Urea | |
|---|---|---|
| | Permissible | Recommended |
| Formaldehyde | 1.5–3 | 2–2.5 |
| Furfuryl Alcohol | 0.2–3 | 0.5–1.5 |

While the resin may be the more usual urea formaldehyde condensation product, the need for and the effect of the retarder is particularly great when the resin has been modified by the furfuryl alcohol.

The curing agent for the resin is also conventional, namely an acidic salt, i.e., one that in water establishes a pH below 7 and thus promotes liberation of some nitrous acid from the nitrite. Other acidic salts that illustrate the class to be used are ammonium, aluminum or zinc sulfate, chloride and nitrate. With said acid compound I use for best results additional urea admixed subsequent to the condensation with formaldehyde, in any proportion usual for this added material, e.g., 5–15 parts of urea and 1–4 parts of the acidic compound for 100 parts of the resin.

As the nitrite component of the retarder or pot life extension at ordinary temperatures, sodium nitrite is economical, effective and water soluble. Other appreciably soluble nitrites or nitrite sources that may be used include potassium, other alkali metal and calcium nitrites, potassium cobalti-nitrite, and amyl butyl and amyl nitrites.

For satisfactory commercial results it is necessary to use, with the nitrite, an auxiliary component, the preferred example of which is hexamethylenetetramine. Another active auxiliary component that may be used, although less satisfactorily, is "Oxazole" (tetrahydro-1-hydroxy-oxazolo - 3,4 - methyleneoxazole - 7 - alpha-methanol, described in U.S. Patent No. 2,951,058).

Proportions of curing catalyst of the retarder components are illustrated in Table 2, Tests a–f, proportions here and elsewhere herein being expressed as parts by weight unless specifically stated to the contrary. In this table, the proportions shown are parts for 100 parts dry weight of resin. The last column shows the time required for the exothermic reaction to raise the reaction mixture to 50° C.

TABLE 2

| Test | Retarder Combination | | Catalyst NH₄Cl | Exotherm, Time to 50° C. |
|---|---|---|---|---|
| | Hexa | Sodium Nitrate | | |
| a | 0.085 | 0.26 | 2.27 | 2.05 hrs. |
| b | 0.17 | 0.51 | 2.27 | 2.97 hrs. |
| c | 0.25 | 0.85 | 2.27 | 2.32 hrs. |
| d | 0.34 | 1.12 | 2.27 | 19.75 hrs. |
| e | 0.51 | 1.71 | 2.27 | 4 days. |
| f | 1.27 | 4.24 | 2.27 | 4+ days. |
| g | 0 | 0 | 2.27 | 1 hr. |

Table 3 shows proportions that are permissible and those recommended for commercial use.

TABLE 3

| Component | Parts for 100 Parts Dry Weight of Furfuryl-Alcohol-Modified Urea Formaldehyde Condensate (the "Resin") | |
|---|---|---|
| | Permissible | Recommended |
| Catalyst | 0.5–4 | 1.5–3 |
| Nitrite | 0.2–4.5 | 0.5–2.5 |
| Hexa | 0.08–1.3 | 0.1–1 |

In general, the catalyst or acidic curing compound is used in amount to establish the pH, during the curing of the resin, within the range desired, e.g., pH 1–4.5.

The nitrite is suitably compounded with the resinous condensate, the curing catalyst with the hexa or alternative therefor, and the two separate mixtures so made are then uniformly mixed together before or during the application of the composition to the sand or other material to be bonded. The whole is then shaped, as by being blown cold into the space defined by the heated walls of the mold or other shaping form, removed therefrom when molded and partially bonded to a mass that is shape retaining and self supporting. The curing is then completed in air, by the exotherm of curing.

The temperature of the core box, that is, of the walls thereof against which the molding is made in one use of the invention, is ordinarily about 425° F. although a range of 350°–500° is satisfactory. The dwell time of the composition in the mold before removal therefrom is 5–120 seconds, 10–30 seconds being usually sufficient.

The invention will be further illustrated by description in connection with the following specific examples:

*Example I*

Although a purchased furfuryl-alcohol-modified urea formaldehyde condensate may be used, it was made for this example as follows:

Formaldehyde gas from commercial methanol oxidation units was passed into a warm aqueous solution of urea in an absorbing tower. The resulting concentrate represented approximate proportions of components, as follows: urea 25%, formaldehyde 60%, and water 15%, the urea and formaldehyde being condensed in part at least to a further curable condition.

Into 55.13 parts of the above concentrate there were introduced 8 parts of additional urea and 32.6 parts of commercial furfuryl alcohol. The whole was then warmed as to 35°C., until the additional urea had dissolved. A 50% solution of phosphoric acid was next introduced in amount to lower the pH to 5.8–6.2, this requiring about 0.03 part of the acid solution. Refluxing was then conducted to a Gardner viscosity of M–N. Then the material was cooled to 30° C. A 50% solution of sodium hydroxide was admixed in the amount of about 0.03 part, in order to raise the pH to 7–7.2, and also 4.44 parts of urea. This makes the total weight of the composition after minor losses about 100 parts. The whole was then heated to dissolve the added urea, as to about 35° C.

To a portion of the solution of pH 7.2–7.4, representing 100 parts of resin solids, there were added 15.5 parts catalyst solids in the form of a solution containing 7% ammonium chloride, 39% urea and 54% water.

In the resulting "Solution A," of 100 parts resin solids and 15.5 parts catalyst solids, there were included 1.71 parts sodium nitrite and 0.51 part hexamethylenetetramine, the nitrite being premixed into the resin solution and the hexa in the solution of the catalyst composition. The pot life was more than 4 days. In a comparable test with the nitrite omitted, the pot life was only 0.95 hr.

*Example II*

The composition and procedure of Example I were used except that the proportions and kinds of nitrite and proportions of hexa for 100 parts dry weight of resin were varied, in manner and with the results shown in Table 4.

The slowness of rise of temperature, with no external heating, is an indication of length of pot life for the several preparations.

TABLE 4

| Parts and Kind of Nitrite Used | Hexa, Parts | Time to 50° C. |
| --- | --- | --- |
| 1.05 potassium | 0.25 | 2 hrs. |
| 2.1 potassium | 0.51 | 5 days. |
| 3.14 potassium | 0.765 | 15 days. |
| 0.985 potassium cobalti- | 0.25 | 1.43 hrs. |
| 1.97 potassium cobalti- | 0.51 | 1.23 hrs. |
| 2.96 potassium cobalti- | 0.765 | 2.92 hrs. |
| 1.22 butyl | 0.51 | 4.5 hrs.[1] |
| 2.45 butyl | 0.51 | 4.5 hrs.[1] |

[1] Time to start of temperature rise to maximum of 38.4°; no violent exotherm but gradual hardening.

Sodium nitrite 1.71 parts is stoichiometrically equivalent to 2.1 parts potassium nitrite, 1.97 parts potassium cobalti-nitrite and 2.45 parts butyl nitrite.

*Example III*

The composition and procedure of Example I are followed except that the sodium nitrite there used is replaced by an equal weight of each of the other nitrites disclosed herein, used separately and in turn.

*Example IV*

The procedure and composition of Example I are used except that the hexa there employed is replaced by varying amounts of "Oxazole" for 100 parts dry weight of the resin. The proportions and the period of time for the exotherm to raise the temperature from room to 50° C. are shown in Table 5 below.

TABLE 5

| Parts, Additive | Sodium Nitrite | Time to 50° C. |
| --- | --- | --- |
| 1.71 Oxazole | 0 | 1.48 hrs. |
| 0.51 Oxazole | 1.71 | 3 days. |
| 0.51 Oxazole | 0.17 | 5.21 hrs. |

*Example V*

"Solution A" (including the furfuryl-alcohol-modified urea formaldehyde resin and the ammonium chloride and urea curing composition in amount providing 100 parts of resin solids) and the retarder combination consisting of 1.71 parts of sodium nitrite and 0.51 part of hexa were mixed in the proportion of 2 parts total weight into 100 parts of commercially dry foundry sand. The sand with admixed binder composition remained flowable at atmospheric temperature for 24 hours.

When the sand with admixed binder composition is blown into and shaped against the heated walls of a hot box for molding foundry sand mixtures at wall temperatures of about 425° C., the blown composition becomes self supporting and firm enough for removal from the mold in the course of approximately 10–30 seconds, the exact time varying with the conditions of molding and heating by the walls. When the molded and partially bonded sand form is removed from the mold, the temperature continues to rise because of the exotherm, to give a fully cured resin binder in the product.

The novel retarder composition effectively increases the pot life of furfuryl-alcohol-modified and other urea resins 40–100-fold for storage at the ordinary temperature but, when compounded with sand and heated in a mold above about 50° C., the retarder does not prevent curing quickly and exothermically, to commercially useful foundry cores.

It will be understood that it is intended to cover all changes and modifications of the examples of the invention herein chosen for the purpose of illustration which do not constitute departures from the spirit and scope of the invention.

I claim:
1. In an aqueous composition including furfuryl-alcohol-modified urea formaldehyde condensate as the resin and an acidic curing catalyst therefor in amount to establish the pH below 7, the improvement comprising an admixed retarder of curing at low temperatures, the retarder comprising the combination of a water soluble nitrite and hexamethylenetetramine, the proportion on a dry basis, for 100 parts of said condensate, being approximately .2 to 4.5 parts of said nitrite and .08 to 1.3 parts of said hexamethylenetetramine.

2. The composition of claim 1, said nitrite being an alkali metal nitrite.

3. The composition of claim 1, said nitrite being an alkali metal nitrite and said curing agent including admixed urea.

4. The composition of claim 1, said nitrite being sodium nitrite.

5. The composition of claim 1 including 5 to 15 parts of urea admixed with the nitrite and the nitrite being sodium nitrite.

6. In making a shaped and bonded article by applying, to the material to be bonded, a composition including furfuryl-alcohol-modified urea formaldehyde condensate as the resin and an acidic curing catalyst therefor and then curing the resin, the improvement comprising admixing into said resin, in advance of said curing, a retarder of curing at low temperatures, the retarder comprising the combination of a water soluble nitrite and hexamethylenetetramine, the proportion on a dry basis, for 100 parts of said condensate, being approximately .2 to 4.5 parts of said nitrite and .08 to 1.3 parts of said hexamethylenetetramine.

7. A pot life extender and retarder of curing of acidic furfuryl-alcohol-modified urea formaldehyde condensate compositions, said retarder being the combination of a water soluble nitrite and hexamethylenetetramine, the proportion on a dry basis, for 100 parts of said condensate, being approximately .2 to 4.5 parts of the nitrite and .08 to 1.3 parts of the hexamethylenetetramine.

8. A pot life extender and retarder of curing of acidic furfuryl-alcohol-modified urea formaldehyde condensate compositions, said retarder being the combination of an alkali metal nitrite and hexamethylenetetramine, the proportion on a dry basis, for 100 parts of said condensate, being approximately .2 to 4.5 parts of the nitrite and .08 to 1.3 parts of the hexamethylenetetramine.

References Cited by the Examiner
UNITED STATES PATENTS

| | | | |
|---|---|---|---|
| 2,059,609 | 11/1936 | Rossiter et al. | 260—69 |
| 2,062,171 | 11/1936 | Fuchs | 260—69 |
| 2,236,184 | 3/1941 | Menger | 260—29.4 |
| 2,345,456 | 3/1944 | Bruson | 260—69 |
| 2,510,496 | 6/1950 | Carlin | 260—70 |
| 2,634,255 | 4/1953 | Patterson | 260—70 |

MURRAY TILLMAN, *Primary Examiner.*

J. C. BLEUTGE, *Assistant Examiner.*